United States Patent Office 2,800,507
Patented July 23, 1957

2,800,507

PRODUCTION OF PIMELIC ACID

Dennis James George Long, Tadworth, England, assignor to The Distillers Company Limited, Edinburgh, Scotland, a British company No Drawing. Application July 22, 1952,
Serial No. 300,327

Claims priority, application Great Britain August 9, 1951

2 Claims. (Cl. 260—537)

The present invention relates to an improved process for the production and purification of pimelic acid.

Pimelic acid salts may be prepared by the treatment of delta$^3$-tetrahydrobenzoic acid, or its chemical equivalent, with an alkali metal hydroxide, at temperatures in the range 250°–400° C., and suitably in the range 300°–350° C. The separation of pure pimelic acid from the reaction product thus obtained has been found to present difficulty, and it is an object of the present invention to provide a simple and efficient method for the recovery of pimelic acid from such reaction products.

It has now been found that if such a reaction product is acidified and at least a part, and preferably the whole, of the low boiling impurities (that is the impurities having a boiling point lower than that of pimelic acid) removed from the crude pimelic acid and the residue taken up in hot water to dissolve the pimelic acid, the products separate while hot into an aqueous phase and an oily or tarry phase, and by separating these two phases, as by decantation, pure pimelic acid may be readily recovered from the separated aqueous phase.

According to the present invention, the product obtained by the treatment of delta$^3$-tetrahydrobenzoic acid, or its chemical equivalent, with an alkali metal hydroxide at temperatures in the range 250°–400° C., is acidified, at least a part, and preferably the whole, of the low boiling impurities, i. e. the impurities more volatile than pimelic acid, removed from the crude pimelic acid by a distillation process, the distillation residue taken up in hot water to dissolve the pimelic acid, the aqueous product allowed to separate into an aqueous phase and an oily or tarry phase, and the pimelic acid recovered from said aqueous phase.

The chemical equivalents of delta$^3$-tetrahydrobenzoic acid are those compounds which are capable of yielding delta$^3$-tetrahydrobenzoic acid or salts thereof on treatment with alkali metal hydroxides. Such compounds include esters of delta$^3$-tetrahydrobenzoic acid, such, for example, as delta$^3$-tetrahydrobenzyl-delta$^3$-tetrahydrobenzoate, delta$^3$-tetrahydrobenzonitrile, delta$^3$-tetrahydrobenzaldehyde, and like compounds.

The alkaline reaction product is suitably freed from neutral oily materials, prior to the acidification step specified above, for example by decantation or solvent extraction. The solution remaining after these treatments is then acidified and the low boiling impurities associated with the pimelic acid removed by a distillation process. Alternatively, these neutral oily materials may be separated from the aqueous pimelic acid solution after acidification thereof.

The acidification of the alkaline reaction product may be effected in the conventional manner using any acid, inorganic or organic, which is stronger than pimelic acid. It is preferred to use a mineral acid such as hydrochloric acid for this purpose as risk of contaminating the pimelic acid with difficultly removable acids or metal salts is obviated.

The reaction product per se containing the pimelic acid or the residual solution after solvent extraction of the neutral oily materials, may be subjected to the step of distillation, or alternatively, the crude pimelic acid may be permitted to precipitate out from such solutions, the crude solid pimelic acid being separated and then subjected to the step of distillation.

The distillation process is preferably a steam distillation. When steam distilling, the residue from the distillation will be already taken up in water and separates while still hot into a clear aqueous phase an oily or tarry phase. When distilling, in the ordinary way in the absence of steam, it is necessary to treat the distillation residue with water to dissolve the pimelic acid. The aqueous product so formed also separates into two phases, a clear aqueous phase comprising a solution of the pimelic acid and an oily or tarry phase.

The aqueous phase, however obtained, is suitably decanted off while still hot, and then allowed to cool to permit the pure pimelic acid to crystallise out. The crystalline pimelic acid may then be filtered off. The aqueous mother liquors may be treated, as by solvent extraction, for the recovery of any residual pimelic acid, or alternatively, part or the whole of the mother liquors returned to the distillation stage of the process.

The separated aqueous phase comprising the solution of pimelic acid may, if desired, be further concentrated before crystallising out the pimelic acid, or, alternatively, the pimelic acid may be recovered by other suitable means from this separated aqueous phase.

By way of illustration one embodiment of the present invention comprises acidifying the alkaline reaction product, steam distilling the acidified product to remove impurities of lower boiling point than the pimelic acid, allowing the distillation residue to separate while hot into an aqueous phase and a tarry phase, isolating, as by decantation, the aqueous phase and recovering the pimelic acid therefrom. Another embodiment of the invention comprises acidifying the alkaline reaction product, allowing the crude pimelic acid to precipitate from the aqueous solution forming the acidified reaction product, distilling the crude pimelic acid to remove impurities of lower boiling point than the pimelic acid, dissolving the distillation residue in hot water, separating the clear aqueous solution of pimelic acid from the residual tar, isolating, as by decantation, the aqueous phase and recovering the pimelic acid therefrom. Yet another embodiment of the invention comprises acidifying the alkaline reaction product, allowing the crude pimelic acid to precipitate from the aqueous solution forming the acidified reaction product, steam distilling the crude pimelic acid to remove impurities of lower boiling point than the pimelic acid, allowing the distillation residue to separate while hot into an aqueous phase and a tarry phase, isolating, as by decantation, the aqueous phase and recovering the pimelic acid therefrom.

The following examples are given to illustrate the process of the present invention. The parts by weight and parts by volume quoted bear the same relation to one another as do grams to millilitres.

*Example 1*

An aqueous solution of sodium delta$^3$-tetrahydrobenzoate containing caustic soda, the molecular ratio of caustic soda to sodium delta$^3$-tetrahydrobenzoate being approximately 1:1, is heated in an autoclave for 3 hours at 340°–350° C., the reaction mixture containing 11.5 parts by weight of caustic soda per 100 parts by volume of water. The product obtained amounting to 165 parts by volume is cooled and then decanted, separating 2.5 parts by weight of oil. The remaining aqueous solution is acidified with 70 parts by volume of concentrated hydrochloric acid (specific gravity 1.16) and then steam distilled at a kettle-temperature of about 105° C., until 1100 parts by volume of distillate has been collected.

The black oil originally present in the kettle partly solidifies during the steam distillation and is easily separated from the hot aqueous solution. The latter comprising 290 parts by volume, is allowed to cool, when 31 parts by weight of pimelic acid (melting point 96°–98° C.; equivalent weight 79.0) crystallises out. A further 9.7 parts by weight of pimelic acid are extracted from the mother liquors by solvent extraction with ether. The black residue from the steam distillation was found to contain less than 1.0 part by weight tetrahydrobenzoic acid, 2.0 parts by weight pimelic acid, and 6.5 parts by weight of non-distillable materials.

Example 2

An aqueous solution of sodium delta$^3$-tetrahydrobenzoate containing caustic soda, the molecular ratio of caustic soda to sodium delta$^3$-tetrahydrobenzoate being approximately 1:1, is heated at a temperature of 320° C. for 3 hours in an autoclave, the reaction mixture containing 11.5 parts by weight of caustic soda per 100 parts by volume of water. The product obtained, amounting to 376 parts by volume is cooled and then decanted, separating 2.4 parts by weight of oil. The remaining aqueous solution is acidified with 190 parts by volume of concentrated hydrochloric acid (specific gravity 1.16) and then steam distilled at a kettle temperature of about 105° C. until 1343 parts by volume of distillate has been collected.

The residual liquid in the kettle consists of an aqueous solution and some oily material. The latter is separated by decantation while hot and the clear aqueous solution remaining is allowed to cool when 68.6 parts by weight of pimelic acid (melting point 98–100° C.; equivalent weight 82.9) crystallises out. The mother liquors, on solvent extraction, furnished another 16.5 parts by weight of pimelic acid. The oily layer decanted after the steam distillation was found to contain 4.4 parts by weight of pimelic acid.

Example 3

An aqueous solution of sodium delta$^3$-tetrahydrobenzoate containing caustic soda, the molecular ratio of caustic soda to sodium delta$^3$-tetrahydrobenzoate being approximately 1:1, is heated at a temperature of 310°–320° C. for 3 hours in an autoclave, the reaction mixture containing 11.5 parts by weight of caustic soda per 100 parts by volume of water. The product obtained, amounting to 345 parts by volume, is extracted with ether to remove neutral materials and is then acidified to Congo red with concentrated hydrochloric acid (specific gravity 1.16). The crude pimelic acid which separates is filtered off, washed with a little cold water and then added to water and steam distilled at a kettle temperature of 105° C. until 1,000 parts by volume of distillate has been collected. The residue in the kettle consists of a clear aqueous solution and a solid water insoluble material. The aqueous solution is filtered off while hot, and then allowed to cool when the pimelic acid crystallises out. 70 parts by weight of crystalline pimelic acid (melting point 94°–98° C.; equivalent weight 91.4) are obtained.

Example 4

An aqueous solution of potassium delta$^3$-tetrahydrobenzoate containing caustic potash, the molecular ratio of caustic potash to potassium delta$^3$-tetrahydrobenzoate being approximately 1:1, is heated in an autoclave for 3 hours at 340°–350° C. The product obtained is subjected to the procedure described in Example 1, substantially the same results being obtained.

Example 5

The procedure of any of the preceding examples is repeated wherein the alkaline reaction product prepared by the treatment of delta$^3$-tetrahydrobenzoic acid or its chemical equivalents is acidified with any one of the following acids: sulphuric acid, phosphoric acid and nitric acid.

I claim:

1. A process for the purification of crude pimelic acid prepared by the reaction of a material selected from the group consisting of $\Delta^3$-tetrahydrobenzoic acid, alkaline salts of $\Delta^3$-tetrahydrobenzoic acid, $\Delta^3$-tetrahydrobenzyl-$\Delta^3$-tetrahydrobenzoate, $\Delta^3$-tetrahydrobenzonitrile and $\Delta^3$-tetrahydrobenzaldehyde with an alkali metal hydroxide in the presence of water at a temperature in the range of 250°–400° C. which comprises the steps of acidifying the reaction product containing an alkali metal salt of pimelic acid, subjecting the resultant aqueous crude pimelic acid to steam distillation to remove impurities boiling below pimelic acid, separating the aqueous phase containing the pimelic acid and recovering the pimelic acid therefrom.

2. A process for the purification of crude pimelic acid containing oily material prepared by the reaction of a material selected from the group consisting of $\Delta^3$-tetrahydrobenzoic acid, alkaline salts of $\Delta^3$-tetrahydrobenzoic acid, $\Delta^3$-tetrahydrobenzyl-$\Delta^3$-tetrahydrobenzoate, $\Delta^3$-tetrahydrobenzonitrile and $\Delta^3$-tetrahydrobenzaldehyde, with an alkali metal hydroxide in the presence of water at a temperature in the range of 250°–400° C. which comprises the steps of removing said oily material, acidifying the reaction product containing an alkali metal salt of pimelic acid, subjecting the resultant aqueous crude pimelic acid to steam distillation to remove impurities boiling below pimelic acid, separating the aqueous phase containing the pimelic acid and recovering the pimelic acid therefrom.

References Cited in the file of this patent

UNITED STATES PATENTS

| | | |
|---|---|---|
| 1,921,101 | Schrauth | Aug. 8, 1933 |
| 2,182,056 | Bruson et al. | Dec. 5, 1939 |
| 2,217,516 | Houpt | Oct. 8, 1940 |
| 2,454,047 | Finch et al. | Nov. 16, 1948 |
| 2,673,219 | Major et al. | Mar. 23, 1954 |
| 2,698,339 | Hawkins et al. | Dec. 28, 1954 |

FOREIGN PATENTS

| | | |
|---|---|---|
| 395,193 | Great Britain | July 13, 1933 |

OTHER REFERENCES

French et al.: J. Am. Chem. Soc., vol 64, pp. 1497–1499, (1942).

Muller-Monatshefte fur. Chemie, vol. 65, pp. 18–20 (1934–5).